US010407330B2

(12) United States Patent
Ghylin et al.

(10) Patent No.: US 10,407,330 B2
(45) Date of Patent: Sep. 10, 2019

(54) BIOLOGICAL NUTRIENT REMOVAL PROCESS CONTROL SYSTEM

(71) Applicant: Xylem Water Solutions U.S.A., Inc., Brown Deer, WI (US)

(72) Inventors: Trevor Wayne Ghylin, Wauwatosa, WI (US); Sarah Olivia Elger, Cudahy, WI (US); Daniel Sheldon, Waukesha, WI (US)

(73) Assignee: Xylem Water Solutions U.S.A., Inc., Brown Deer, WI (US)

( * ) Notice: Subject to any disclaimer, the term of this patent is extended or adjusted under 35 U.S.C. 154(b) by 15 days.

(21) Appl. No.: 15/730,158

(22) Filed: Oct. 11, 2017

(65) Prior Publication Data

US 2018/0118594 A1 May 3, 2018

Related U.S. Application Data

(60) Provisional application No. 62/414,259, filed on Oct. 28, 2016.

(51) Int. Cl.
*C02F 3/30* (2006.01)
*C02F 3/28* (2006.01)
(Continued)

(52) U.S. Cl.
CPC ............... *C02F 3/308* (2013.01); *C02F 3/006* (2013.01); *C02F 3/1215* (2013.01); *C02F 3/28* (2013.01); *C02F 3/1263* (2013.01); *C02F 3/301* (2013.01); *C02F 11/12* (2013.01); *C02F 2209/005* (2013.01); *C02F 2209/006* (2013.01);
(Continued)

(58) Field of Classification Search
CPC .. C02F 3/308; C02F 3/006; C02F 3/28; C02F 3/1215; C02F 2209/04; C02F 2209/14; C02F 2209/07; C02F 2209/22; C02F 2209/05; C02F 2209/18; C02F 2209/006; C02F 2209/005; C02F 11/12; C02F 3/301;
(Continued)

(56) References Cited

U.S. PATENT DOCUMENTS 3,681,236 A 8/1972 Bergles et al.
3,847,803 A 11/1974 Fisk
(Continued)

FOREIGN PATENT DOCUMENTS

| CA | 2852298 A1 | 5/2013 |
| KR | 2002-083978 A | * 11/2002 |
| WO | 2007028149 A2 | 3/2007 |

OTHER PUBLICATIONS

Machine-generated translation of KR 2002-0083978, generated on Dec. 13, 2018.*
(Continued)

*Primary Examiner* — Fred Prince
(74) *Attorney, Agent, or Firm* — The Webb Law Firm

(57) ABSTRACT

A process for biological nutrient removal including: receiving fluid having sludge in a basin through a sludge inlet; activating an aeration system based at least partially on a time of day; periodically measuring a potassium level of the fluid; determining a potassium rate of change based on the periodic measurements of potassium level; and deactivating the aeration system based at least partially on the determined potassium rate of change. A system for biological nutrient removal is also disclosed.

25 Claims, 13 Drawing Sheets

(51) Int. Cl.
*C02F 3/12* (2006.01)
*C02F 3/00* (2006.01)
*C02F 11/12* (2019.01)

(52) U.S. Cl.
CPC ...... *C02F 2209/04* (2013.01); *C02F 2209/05* (2013.01); *C02F 2209/06* (2013.01); *C02F 2209/07* (2013.01); *C02F 2209/14* (2013.01); *C02F 2209/18* (2013.01); *C02F 2209/22* (2013.01); *Y02W 10/15* (2015.05)

(58) Field of Classification Search
CPC .... C02F 3/1263; C02F 2209/06; Y02W 10/15
USPC ................... 210/605, 614, 630, 906
See application file for complete search history.

(56) References Cited

U.S. PATENT DOCUMENTS

| | | |
|---|---|---|
| 4,940,544 A | 7/1990 | Gode et al. |
| 4,983,297 A | 1/1991 | Kaczmarek et al. |
| 5,785,853 A * | 7/1998 | Isogai .............. C02F 1/30 |
| | | 210/614 |
| 5,942,108 A * | 8/1999 | Yang ............ C02F 3/1263 |
| | | 210/195.3 |
| 6,344,143 B1 | 2/2002 | Ahn et al. |
| 7,150,832 B2 | 12/2006 | Stafford |
| 7,563,374 B2 | 7/2009 | McWhirter et al. |
| 8,652,329 B2 | 2/2014 | Jowett |
| 9,272,931 B2 | 3/2016 | Robertson et al. |
| 2006/0163156 A1* | 7/2006 | Eto .................... C02F 3/301 |
| | | 210/605 |
| 2007/0045179 A1 | 3/2007 | Brase |
| 2010/0264083 A1 | 10/2010 | Biesinger |
| 2012/0085704 A1 | 4/2012 | Jenkins et al. |
| 2012/0103888 A1 | 5/2012 | Holt |
| 2013/0092628 A1 | 4/2013 | Irie |
| 2013/0146535 A1* | 6/2013 | Albert ................ C02F 1/008 |
| | | 210/614 |
| 2013/0153494 A1* | 6/2013 | Wang ................... C02F 3/02 |
| | | 210/620 |
| 2014/0054206 A1 | 2/2014 | O'Regan, Jr. |
| 2014/0319055 A1 | 10/2014 | Doyle et al. |
| 2015/0166381 A1* | 6/2015 | Li ...................... C02F 3/1278 |
| | | 210/177 |
| 2016/0115054 A1 | 4/2016 | Bock et al. |

OTHER PUBLICATIONS

Bi et al., "Phosphorus release mechanisms during digestion of EBPR sludge under anaerobic, anoxic and aerobic conditions", Water Science and Technology, 2013, pp. 1953-1959, vol. 67:9.
Ju, "Phosphorus Release in Aerobic Sludge Digestion", WEFTEC, 2002, 16 pp.
Miklos, "Optimizing Aerobic Digestion", Hazen and Sawyer, Jun. 5, 2013, 37 pp.
Musvoto et al., "Extension and application of the three-phase weak acid/base kinetic model to the aeration treatment of anaerobic digester liquors", Water SA, 2000, pp. 417-438, vol. 26:4.
Peddie et al., "Use of ORP for Monitoring and Control of Aerobic Sludge Digestion", J. Environ. Eng., 1990, pp. 461-471, vol. 116.

* cited by examiner

| Genus | Digester Process | SBR Process |
|---|---|---|
| % of Total Bacteria in Sample | 14.30% | 11.35% |
| Propionivibrio | 7.31% | 6.59% |
| Microthrix | 4.89% | 7.77% |
| Haliscomenobacter | 6.40% | 6.24% |
| Flavobacterium | 2.69% | 5.29% |
| Dechloromonas | 2.85% | 3.17% |

FIG. 9

BIOLOGICAL NUTRIENT REMOVAL PROCESS CONTROL SYSTEM

CROSS REFERENCE TO RELATED APPLICATIONS

This application claims the benefit of U.S. Provisional Application No. 62/414,259, filed Oct. 28, 2016, the disclosure of which is hereby incorporated in its entirety by reference.

BACKGROUND OF THE INVENTION

Field of the Invention

The present invention relates to a process and a system for biological nutrient removal.

Description of Related Art

Activated sludge aeration is typically the largest energy consumer in biological wastewater treatment plants. An aerobic digestion process is one of the most common methods for biosolids treatment which is typically the second largest consumer of energy in a wastewater treatment facility. Biological wastewater treatment and aerobic digestion suffer from high energy consumption as they are typically designed and operated fully aerated all of the time. Fully aerated conditions not only waste energy, but they also result in poor biological nutrient (nitrogen and phosphorus) removal.

Most conventional wastewater treatment plants have fully aerated basins that do not allow for anoxic (nitrate present but no oxygen) or anaerobic (no oxygen or nitrate) conditions which are necessary for nitrogen and phosphorus removal. Likewise, aerobic digestion typically has constant aeration resulting in high amounts of nitrogen (ammonia/nitrate) and soluble phosphorus that are produced in the process and are ultimately recycled into the mainstream wastewater treatment process where they require additional aeration energy and chemicals for treatment.

Treatment plants that need to meet effluent phosphorus limits frequently have to dose chemicals such as ferric chloride, aluminum chloride, or others to remove phosphorus from their mainstream treatment process. Some plants then have to dose chemicals to recover alkalinity. Much of the phosphorus and nitrogen load on the treatment plant is produced by the aerobic digestion process due to cell destruction and release of phosphorus from phosphorus accumulating organisms. These soluble nutrients are returned to the main treatment process when digested biosolids are dewatered (via belt press, centrifuge or other method), and filtrate/centrate is returned to the plant.

Therefore, there is a need in the art for a process and system for removing biological nutrients that does not waste energy and that results in efficient removal of biological nutrients.

SUMMARY OF THE INVENTION

According to a non-limiting embodiment, provided is a process for biological nutrient removal including: receiving fluid having sludge in a basin through a sludge inlet; activating an aeration system based at least partially on a time of day; periodically measuring a potassium level of the fluid; determining a potassium rate of change based on the periodic measurements of potassium level; and deactivating the aeration system based at least partially on the determined potassium rate of change.

The process may further include determining a phosphorus level of the fluid based partially on the periodic measurements of potassium level. The process may further include an aerobic process during which the aeration system is activated and an anaerobic process during which the aeration system is deactivated, where the process alternates between the aerobic process and the anaerobic process. During the course of a day, the anaerobic process may run for a longer time than the aerobic process. The aeration system may be deactivated after the determined potassium rate of change is greater than or equal to zero. The process may further include determining a rolling average of the potassium rate of change for a predetermined period and deactivating the aeration system after the rolling average is greater than or equal to zero. The process may further include activating a blower configured to deliver airflow to the fluid in the basin after activation of the aeration system, and at a predetermined period of time before determining the potassium rate of change. The process may further include mixing the fluid after activating the aeration system. The process may further include removing liquid substantially free of solids from the basin. The process may further include removing the sludge from the basin and dewatering treated sludge.

According to another non-limiting embodiment, provided is a system for biological nutrient removal including: a basin having an inlet for receiving a fluid including sludge; an aeration system configured to provide air to the fluid; a measuring device disposed in the fluid and configured to periodically measure a potassium level of the fluid; and a controller in communication with the measuring device and the aeration system. The controller is configured to determine a potassium rate of change and to activate and deactivate the aeration system.

The controller may be configured to determine a phosphorus level of the fluid based partially on the periodic measurements of potassium level from the measuring device. The system may be configured to run an aerobic process during which the aeration system is activated and an anaerobic process during which the aeration system is deactivated, where the system is configured to alternate between the aerobic process and the anaerobic process. During a course of a day, the system may be configured to run the anaerobic process for a longer time than the aerobic process. The controller may be configured to deactivate the aeration system after the potassium rate of change is determined to be greater than or equal to zero. The controller may be configured to determine a rolling average of the potassium rate of change for a predetermined period and to deactivate the aeration system after the rolling average is determined to be greater than or equal to zero. The system may further include a blower configured to deliver airflow to the fluid in the basin after activation of the aeration system, and at a predetermined period of time before the controller determines the potassium rate of change. The system may further include a mixer disposed in the basin and configured to mix the fluid after the controller activates the aeration system. The system may further include a decanter configured to remove liquid substantially free of solids from the basin. The system may further include a sludge pump configured to remove treated sludge from the basin, and a dewatering system configured to dewater the sludge.

According to another non-limiting embodiment, provided is a process for biological nutrient removal including:

receiving fluid including sludge in a basin through a sludge inlet; alternating between an anaerobic process state in which an aeration system is deactivated in order to achieve fermenting conditions and an aerobic process in which the aeration system is activated in order to achieve aerobic conditions; settling the fluid including sludge and removing liquid substantially free from solids from the basin after aerobic conditions have been achieved; and removing the treated sludge after aerobic conditions have been achieved for at least one hour, and removal of the sludge occurs with the aeration system activated.

The anaerobic process may be run for at least 8 hours. The aerobic process may be run for at least 1 hour. A duration of the aerobic process may be controlled and/or terminated based on a determined potassium level and/or phosphorous level. The settling and liquid removal step may occur after the aeration system has been activated for at least one hour. The treated sludge removal step may occur after the aeration system has been activated for at least one hour.

Further non-limiting embodiments will now be set forth in the following numbered clauses.

Clause 1: A process for biological nutrient removal comprising: receiving fluid comprising sludge in a basin through a sludge inlet; activating an aeration system based at least partially on a time of day; periodically measuring a potassium level of the fluid; determining a potassium rate of change based on the periodic measurements of potassium level; and deactivating the aeration system based at least partially on the determined potassium rate of change.

Clause 2: The process of clause 1, further comprising determining a phosphorus level of the fluid based partially on the periodic measurements of potassium level.

Clause 3: The process of clause 1 or 2, further comprising an aerobic process during which the aeration system is activated and an anaerobic process during which the aeration system is deactivated, wherein the process alternates between the aerobic process and the anaerobic process.

Clause 4: The process of clause 3, wherein, during the course of a day, the anaerobic process runs for a longer time than the aerobic process.

Clause 5: The process of any of the preceding clauses, wherein the aeration system is deactivated after the determined potassium rate of change is greater than or equal to zero.

Clause 6: The process of any of the preceding clauses, further comprising determining a rolling average of the potassium rate of change for a predetermined period and deactivating the aeration system after the rolling average is greater than or equal to zero.

Clause 7: The process of any of the preceding clauses, further comprising activating a blower configured to deliver airflow to the fluid in the basin after activation of the aeration system, and at a predetermined period of time before determining the potassium rate of change.

Clause 8: The process of any of the preceding clauses, further comprising mixing the fluid after activating the aeration system.

Clause 9: The process of any of the preceding clauses, further comprising removing liquid substantially free of solids from the basin.

Clause 10: The process of any of the preceding clauses, further comprising removing treated sludge from the basin and dewatering the sludge.

Clause 11: A system for biological nutrient removal comprising: a basin comprising an inlet for receiving a fluid comprising sludge; an aeration system configured to provide air to the fluid; a measuring device disposed in the fluid and configured to periodically measure a potassium level of the fluid; and a controller in communication with the measuring device and the aeration system, the controller configured to determine a potassium rate of change and to activate and deactivate the aeration system.

Clause 12: The system of clause 11, wherein the controller is configured to determine a phosphorus level of the fluid based partially on the periodic measurements of potassium level from the measuring device.

Clause 13: The system of clause 11 or 12, wherein the system is configured to run an aerobic process during which the aeration system is activated and an anaerobic process during which the aeration system is deactivated, wherein the system is configured to alternate between the aerobic process and the anaerobic process.

Clause 14: The system of clause 13, wherein, during a course of a day, the system is configured to run the anaerobic process for a longer time than the aerobic process.

Clause 15: The system of any of clauses 11-14, wherein the controller is configured to deactivate the aeration system after the potassium rate of change is determined to be greater than or equal to zero.

Clause 16: The system of any of clauses 11-15, wherein the controller is configured to determine a rolling average of the potassium rate of change for a predetermined period and to deactivate the aeration system after the rolling average is determined to be greater than or equal to zero.

Clause 17: The system of any of clauses 11-16, further comprising a blower configured to deliver airflow to the fluid in the basin after activation of the aeration system, and at predetermined period of time before the controller determines the potassium rate of change.

Clause 18: The system of any of clauses 11-17, further comprising a mixer disposed in the basin and configured to mix the fluid after the controller activates the aeration system.

Clause 19: The system of any of clauses 11-18, further comprising a decanter configured to remove liquid substantially free of solids from the basin.

Clause 20: The system of any of clauses 11-19, further comprising a sludge pump configured to remove treated sludge from the basin, and a dewatering system configured to dewater the sludge.

Clause 21: The process of any of clauses 1-10, comprising periodically determining alkalinity of the fluid using a conductivity sensor.

Clause 22: The process of any of clauses 1-10 and 21, comprising measuring a phosphorus level of the fluid using a phosphorous sensor and/or analyzer and deactivating the aeration system based at least partially on the measured phosphorous level.

Clause 23: The system of any of clauses 11-20, comprising a conductivity sensor configured to determine alkalinity of the fluid.

Clause 24: The system of any of clauses 11-20 and 23, comprising a phosphorous sensor and/or analyzer configured to measure a phosphorous level in the fluid.

Clause 25: A process for biological nutrient removal comprising: receiving fluid comprising sludge in a basin through a sludge inlet; alternating between an anaerobic process state in which an aeration system is deactivated in order to achieve fermenting conditions and an aerobic process in which the aeration system is activated in order to achieve aerobic conditions; settling the fluid comprising sludge and removing liquid substantially free from solids from the basin after aerobic conditions have been achieved; and removing the treated sludge after aerobic conditions have been achieved for at least one hour, wherein removal of the sludge occurs with the aeration system activated.

Clause 26: The process of clause 25, wherein the anaerobic process is run for at least 8 hours.

Clause 27: The process of clause 25 or 26, wherein the aerobic process is run for at least 1 hour.

Clause 28: The process of any of clauses 25-27, wherein a duration of the aerobic process is controlled and/or terminated based on a determined potassium level and/or phosphorous level.

Clause 29: The process of any of clauses 25-28, wherein the settling and liquid removal step occurs after the aeration system has been activated for at least one hour.

Clause 30: The process of any of clauses 25-29, wherein the treated sludge removal step occurs after the aeration system has been activated for at least one hour.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

FIG. 9 shows a table of the concentration of various components from several tests performed using a process according to a non-limiting embodiment of the present invention;

DESCRIPTION OF THE INVENTION

Figure 1:
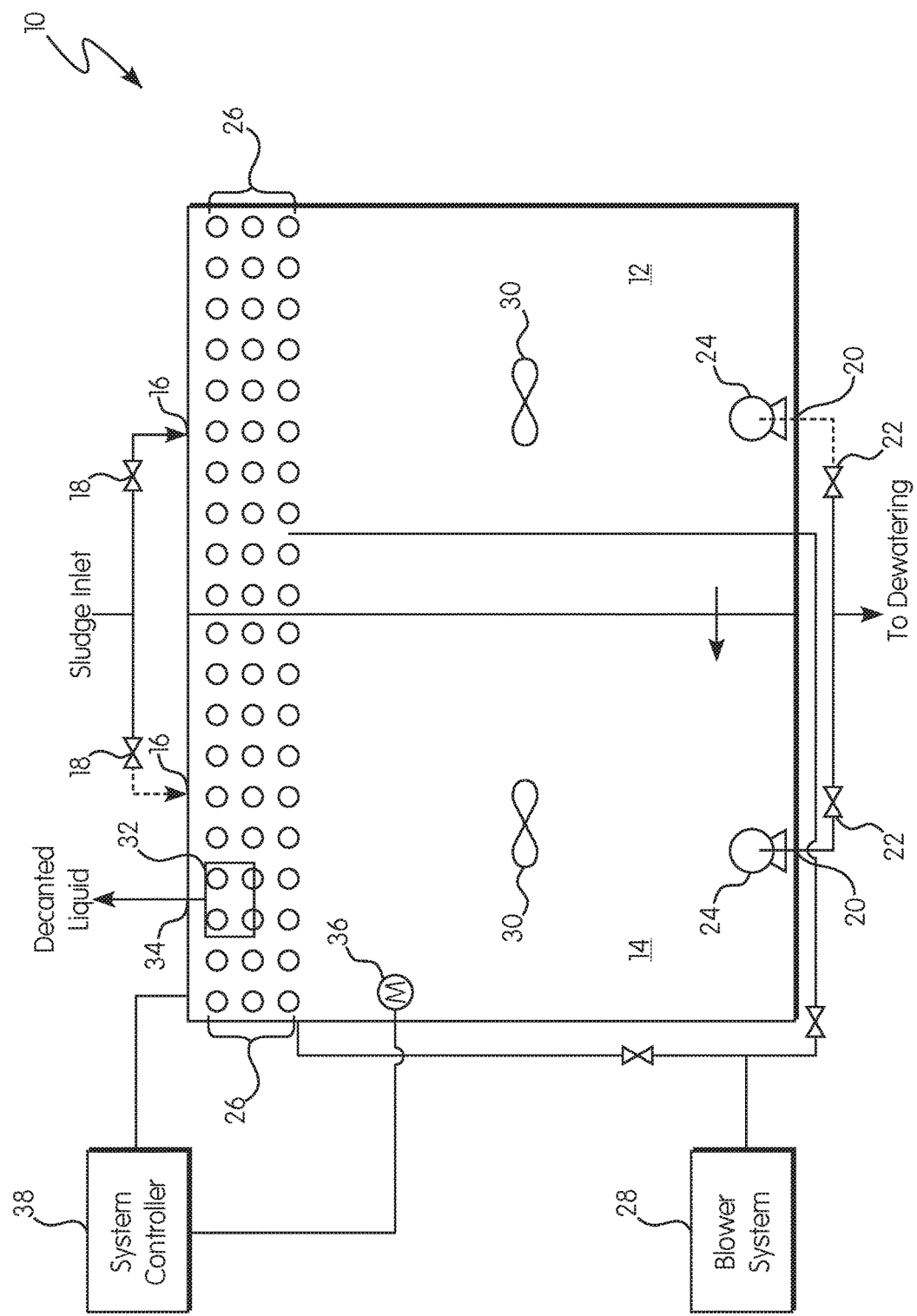
FIG. 1 shows a schematic drawing of a system for biological nutrient removal according to a non-limiting embodiment of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Referring to FIG. 1, a system 10 for biological nutrient removal according to a non-limiting embodiment of the present invention is shown. The system 10 may include a basin 12 to receive a fluid. The basin 12 may include, for example, a digester and/or a sequencing batch reactor (SBR). The fluid may be, for example, wastewater including sludge. The wastewater may include various chemicals and compositions, such as ammonia, ammonium phosphate, calcium, magnesium, nitrate, nitrite, potassium, various types of bacteria, and the like. The basin 12 may be part of a wastewater treatment plant. The basin 12 may include multiple basins (e.g., a first basin 12 and a second basin 14) in fluid communication with one another, or the basin 12 may be a single basin.

With continued reference to FIG. 1, the basin 12 may include at least one sludge inlet 16. Wastewater including sludge may enter the basin 12 through the at least one sludge inlet 16. At least one inlet valve 18 may be provided to control the amount of wastewater entering the basin 12 through the sludge inlet 16. The basin 12 may also include at least one sludge outlet 20. Treated sludge (sludge resulting after the system 10 has been aerated) from the wastewater may exit the basin 12 through the at least one sludge outlet 20. At least one outlet valve 22 may be provided to control the amount of treated sludge that exits the basin 12 through the sludge outlet 20. At least one sludge pump 24 may be provided to pump treated sludge out of the basin 12 through the sludge outlet 20. The treated sludge may then be sent to a dewatering system for dewatering.

With continued reference to FIG. 1, the system 10 may further include an aeration system 26 disposed in the basin 12. The aeration system 26 may be configured to allow gas, such as air and/or oxygen to enter the basin 12. The aeration system 26 may allow gas to enter the basin 12 when the basin 12 is filled with wastewater, such that the wastewater is aerated. A blower system 28 may be in fluid communication with the aeration system 26. The blower system 28 may provide the gas to the aeration system 26 so that the gas flows from the blower system 28 to the aeration system 26 such that the gas enters the basin 12. The aeration system 26 may include vents through which the gas flows to enter the basin 12. The blower system 28 may be turned on and off to provide gas to the basin 12 only when desired. Blower valves may be disposed between the blower system 28 and the aeration system 26 to control the flow of gas to the basin 12.

With continued reference to FIG. 1, a mixer 30 may be disposed in the basin 12 to mix the contents of the basin 12. The mixer 30 may include rotatable blades to effect mixing. The mixer 30 may stir wastewater and the gas from the blower system 28. The mixer 30 may be turned on and off to mix the contents of the basin 12 only when desired. Further, the speed at which the mixer 30 stirs the contents of the basin 12 may be adjusted, as desired. The mixer 30 may be disposed proximate the bottom of the basin 12 at a depth to allow for efficient separation of the system 10.

With continued reference to FIG. 1, a decanter 32 to separate the clear water from the wastewater from the sludge. The decanter 32 may be any other suitable type of separator for separating the clear water from the treated sludge. For example, the decanter 32 may be a filter/recuperative membrane, a centrifuge, or other known separating device. The decanter 32 may be capable of removing a full day of wastewater flow within one hour. For example, if the system 10 produces 10,000 gallons of sludge per day, the decanter 32 may be able to remove 10,000 gallons per hour. The basin 12 may include a decanted liquid outlet 34 through which decanted liquid may leave the system. The decanted liquid may be a clear water having at least a portion of the treated sludge removed. The decanted liquid may be cleaner wastewater than the wastewater flown into the system through the sludge inlet 16. In other words, liquid substantially free of solids may be removed from the basin 12 through the decanted liquid outlet 34. In this case, substantially free of solids means liquid with total suspended solids content that is less than 1% of that found in the digester (e.g. for a digester having 20,000 mg/L total suspended solids, the decanted liquid would have less than 200 mg/L total suspended solids).

With continued reference to FIG. 1, at least one measuring device 36 may be positioned within the basin 12. The measuring device 36 may be positioned in the basin 12 so as to be immersed in the wastewater. The measuring device 36 may be capable of taking relevant measurements in the system 10, such as by taking relevant measurements of the wastewater in the basin 12. The measuring device 36 may be positioned in one or multiple positions in the basin 12 to provide positional measurements, as desired. The measuring device 36 may include a single or multiple sensors and/or analyzers. The measuring device 36 may be capable of measuring a potassium level of the wastewater. The measuring device 36 may be capable of measuring a phosphorous level (e.g., phosphate level) of the wastewater. The measuring device 36 may be capable of measuring a magnesium level of the wastewater. The measuring device 36 may be capable of measuring a calcium level of the wastewater. The measuring device 36 may be capable of measuring a nitrogen level (e.g., ammonia, ammonium, nitrate, nitrite) of the wastewater. The measuring device 36 may be capable of measuring an alkalinity level of the wastewater. The measuring device 36 may be capable of measuring pH of the wastewater. The measuring device 36 may be capable of measuring oxidation-reduction potential (ORP) of the wastewater. The measuring device 36 may be capable of measuring an oxygen (DO) level of the wastewater. The measuring device 36 may be capable of measuring levels of various bacteria in the wastewater. The measuring device 36 may be capable of measuring other chemicals and/or components and/or properties of the wastewater. The measuring device 36 may be capable of taking discrete or continuous measurements.

With continued reference to FIG. 1, a controller 38 may be provided in the system 10 to control various aspects of the system 10. The controller 38 may be in communication with the measuring device 36 to receive measurements taken by the measuring device 36. The controller may 38 analyze the measurements taken by the measuring device 36 and convert the measurements into useful data for a user to view, such as graphs, tables, and charts of variables in the system 10. The controller 38 may communicate with the measuring device 36 to set the frequency with which measurements are taken by the measuring device 36 and which measurements are taken by the measuring device 36. The controller 38 may also control the various valves in the system 10 (e.g., inlet valve 18, outlet valve 22, blower valves, and the like). The controller 38 may also control the sludge pump 24, the aeration system 26, the blower system 28, the mixer 30, and the decanter 32. The controller 38 may also control other aspects of the system 10. For example, if additional chemicals and/or compositions are added to the system 10 to treat the wastewater, the controller 38 may control the amounts, frequencies, and times that these chemicals and/or compositions are added.

With continued reference to FIG. 1, additional chemicals and/or compositions may be added to the basin 12 to treat the wastewater. The additional chemicals and/or compositions may be added at any of the previously described inlets or other inlets of the basin 12 not indicated. Chemicals and/or compositions may be added to the wastewater to meet effluent limits for the wastewater. For example, chemicals and/or compositions may be added to the wastewater to alter a phosphorous level in the system 10 based on a phosphorous level limit imposed by statute or regulation. Examples of chemicals and/or compositions to treat wastewater may include ferric chloride, aluminum chloride, and the like. In some non-limiting embodiments, the system 10 may not use any additional chemicals to treat the wastewater. For example, phosphorous levels in this embodiment of the system 10 may be controlled below the regulated limit using means other than the addition of chemicals and/or compositions, such as using selective aeration.

Figure 2:
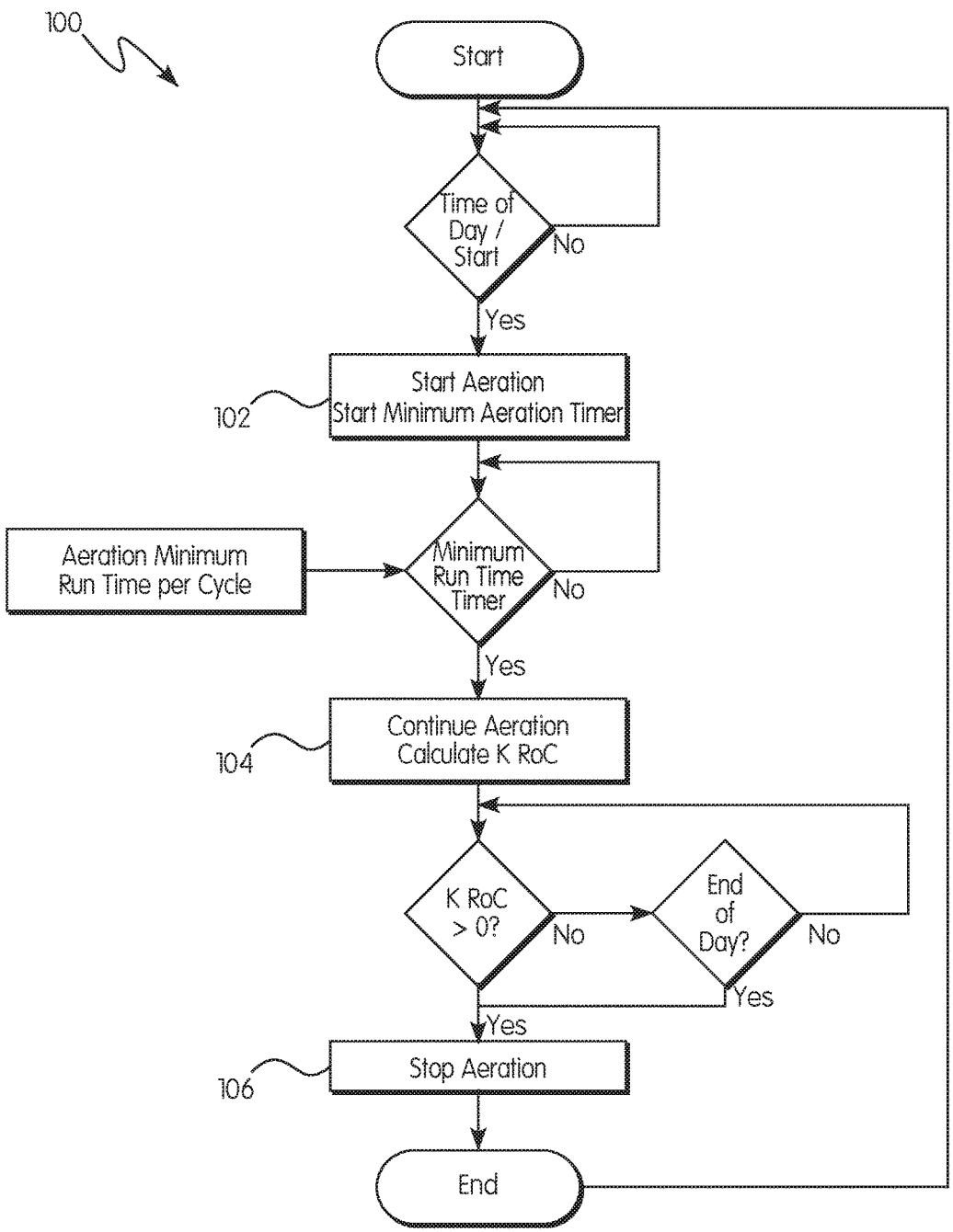
FIG. 2 shows a process flow diagram of a process for biological nutrient removal according to a non-limiting embodiment of the present invention.

Referring to FIG. 2, a process 100 for biological nutrient removal according to a non-limiting embodiment of the present invention is shown. To start the process 100, fluid, such as wastewater having sludge, may be received by the basin 12 through the sludge inlet 16. Aeration may start 102 by the aeration system 26 being activated to allow gas, such as air or oxygen, to enter the basin 12 filled with wastewater. The aeration system 26 may be activated to allow gas to flow into the basin 12 by turning the blower system 28 on or, with the blower system 28 on, opening the blower valves so that the gas can flow from the blower system 28, out the aeration system 26 and into the basin 12. The aeration system 26 may be activated based at least partially on a time of day. For example, the aeration system 26 may be activated at the beginning of the work day, such as at 8:00 AM or 9:00 AM. In some non-limiting embodiments, the aeration system 26 may be activated based on a level of a chemical or composition in the wastewater as measured by the measuring device 36. The controller 38 may initiate activation of the aeration system 26. The mixer 30 may mix the wastewater when the aeration system 26 is activated or after activation of the aeration system 26.

With continued reference to FIG. 2, the measuring device 36 may periodically take relevant measurements of the wastewater in the basin 12. The controller 38 may communicate when to take measurements to the measuring device 36. The measuring device 36 may take measurements before and/or after activation of the aeration system 26. In some non-limiting embodiments, after activation of the aeration system 26, the measuring device 36 does not take any measurements for a minimum run time, as set by the controller 38. The minimum run time delay may allow the system 10, such as levels of the chemicals and components therein, to regulate before any measurements are taken. After the minimum run time, the measuring device 36 may take periodic measurements of the wastewater in the basin 12.

As previously discussed, the measuring device 36 may take any of the following measurements of the wastewater in the basin: a potassium level of the wastewater, a phosphorous level (e.g., phosphate level) of the wastewater, a magnesium level of the wastewater, a calcium level of the wastewater, a nitrogen level (e.g., ammonia, ammonium, nitrate, nitrite) of the wastewater, an alkalinity level of the wastewater, a pH of the wastewater, an ORP potential of the wastewater, a DO level of the wastewater. It will be appreciated that the measuring device 36 may be configured to measure levels of other chemicals and/or components of the wastewater and the system.

In some non-limiting embodiments, the measuring device 36 may measure the ammonium level of the wastewater. The controller 38 may include logic to account for any sensor or analyzer inaccuracy of the measuring device 36 measuring the ammonium level. This may be useful for low concentrations of ammonium, such as ammonium levels less than as setpoint of 2 mg/L. The logic may include a second setpoint to account for sensor inaccuracy at low concentrations. The second setpoint may be, for example, 1 mg/L, while the high ammonium setpoint is 2 mg/L. The controller 38 may keep the aeration system 26 activated if the ammonium level is above the second setpoint in an attempt to achieve a target DO concentration of the wastewater, such as 2 mg/L. The controller 38 may deactivate the aeration system 26 when the ammonium level is above the second setpoint. Due to known limitations of ammonium sensors (e.g., a false high reading of 1.5 mg/L when the actual ammonium concentration is 0 mg/L), the ammonium sensor reading may also be compared to the high ammonium setpoint. If the ammonium reading is below the high setpoint for a predetermined time period, the controller 38 may deactivate the aeration system 26 even if the ammonium setpoint has not been achieved to account for a potentially faulty ammonium sensor.

In some non-limiting embodiments, the measuring device 36 may, via a conductivity sensor, periodically measure alkalinity of the wastewater. The measuring device 36 may periodically measure ORP and/or PH, and based on these measurements, the controller 38 may determine if fully anaerobic and/or fermenting conditions have been achieved in the system 100 sufficient to enable phosphorus uptake with aeration. As used herein, fully anaerobic/fermenting conditions means having a dissolved oxygen concentration of <1 mg/L. Aerobic conditions means having a dissolved oxygen concentration of ≥1 mg/L. The measuring device 36 may periodically measure an ammonium or ammonia level of the wastewater, and based on these measurements, the controller 38 may deactivate the aeration system 26 once the ammonium or ammonia level falls below a predetermined setpoint. The measuring device 36 may periodically measure the phosphate level of the wastewater, and based on these measurements, the controller 38 may deactivate the aeration system 26 once the phosphate level falls below a predetermined setpoint.

With continued reference to FIG. 2, the measuring device 36 may periodically measure the potassium level of the wastewater. In some non-limiting embodiments, the measuring device 36 does not take any potassium measurements for a predetermined period of time after activation of the aeration system 26 (e.g., the minimum run time), and takes periodic measurements thereafter. Based on these measurements, the controller 38 may deactivate 106 the aeration system 26 once the potassium level falls below a predetermined setpoint. Based on this measurement, the controller 38 may determine when biological phosphorous removal (BioP) is complete. In some non-limiting embodiments, the controller 38 may determine a potassium rate of change 104 based on a plurality of measurements by the measuring device 36 of potassium level in the wastewater. The controller 38 may deactivate the aeration system 26 based on the determined potassium rate of change. For instance, the aeration system 26 may be deactivated 106 when the potassium rate of change goes from negative to greater than or equal to zero. In other words, the aeration system 26 may be deactivated 106 when the potassium rate of change ceases to decrease over time. This may indicate that BioP activity in the system 10 is complete. The aeration system 26 may be deactivated 106 when the potassium rate of change reaches a predetermined setpoint.

In some non-limiting embodiments, based on the periodic measured potassium level in the wastewater, the controller 38 may determine a rolling average of the potassium rate of change over a predetermined period. The controller 38 may deactivate 106 the aeration system 26 after the rolling average is greater than or equal to zero or reaches a predetermined setpoint.

The controller 38 may determine a five minute rolling average of potassium level in the wastewater. The controller 38 may determine a sixty minute change in potassium level in the wastewater every minute where $K_{delta60} = K_t - K_{(t-60)}$. The controller may determine a 45 minute rolling average, where $K45_{ave}$ is equal to the forty-five minute rolling average of $K_{delta60}$. The activation system 26 may be deactivated when $K45_{ave}$ is greater than 0 or reaches some other predetermined setpoint. In practice, $K45_{ave}$ may be positive when potassium increases at the beginning of a cycle (when the aeration system 26 is activated) due to mixing and potassium release (e.g., during the minimum run time). $K45_{ave}$ may then become negative and remain negative while phosphorous and potassium uptake occurs during aeration. As the process continues, $K45_{ave}$ may become less negative over time and eventually reach zero to indicate that potassium is no longer decreasing. It is at this time that the controller 38 may deactivate 106 the aeration system 26. It will be appreciated that other periodic potassium rates of change may be determined to control the system.

With continued reference to FIG. 2, in some non-limiting embodiments, based on the measured potassium level in the wastewater, the controller 38 may determine the phosphorous level of the wastewater. The controller 38 may determine the phosphorous level of the wastewater based on a known relationship between potassium level and phosphorous level. The relationship between changing potassium level and phosphorous level may be 1:1 or very near 1:1. This may be desirable in situations in which the potassium level is easier or more cost efficient to measure than phosphorous level. The controller 38 may deactivate the aeration system 26 based on this determined phosphorous level of the wastewater, such as when the determined phosphorous level falls below a predetermined setpoint. A phosphorous rate of change may similarly be calculated based on the potassium measurements, and the phosphorous rate of change may be used by the controller 38 to determine when to deactivate the aeration system 26.

Therefore, in some non-limiting embodiments, the aeration system 26 may be activated and a minimum run time without measurements may pass. The measuring device 36 may then take periodic measurements of potassium level of the wastewater. These measurements may be used to determine when to deactivate the aeration system 26, determine a potassium rate of change, determine a phosphorous level or phosphorous rate of change, and the like.

In some non-limiting embodiments, the aeration system 26 may be deactivated 106 based on a time of day. For example, the aeration system 26 may be deactivated 106 at the end of a work day. The aeration system 26 may be deactivated 106 at the end of a work day even if the predetermined setpoint, such as the predetermined potassium level or potassium rate of change has not been reached by the system 10.

With continued reference to FIG. 2, when the aeration system 26 is activated, the system 10 may run according to an aerobic process, and when the aeration system 26 is deactivated the system 10 may run according to an anaerobic process. The process 100 may alternate between the aerobic process and the anaerobic process. This may be useful because phosphorous uptake may not occur in a system in which the activation system 26 is continually running. The system may need to become sufficiently anaerobic prior to the aeration system 26 being activated in order for phosphorous uptake to occur during the aerobic process. In some non-limiting embodiments, over the course of a day, the anaerobic process runs for a longer time than the aerobic process, meaning the activation system 26 is deactivated for a longer time than it is activated. For example, in one non-limiting embodiment, the process runs the anaerobic process for 20 hours and the aerobic process for 4 hours, and alternates between the two. The anaerobic process running for longer than the aerobic process allows for energy savings, as the aeration system 26 in not running.

The process and system for biological nutrient removal may include receiving fluid (such as wastewater) including sludge in the basin 12 through the sludge inlet 16. The sludge may be treated by alternating between the previously described anaerobic process and aerobic process. For the anaerobic process, the aeration system 26 may be deactivated to achieve fermenting conditions, and for the aerobic process, the aeration system 26 may be activated to achieve aerobic conditions. The fluid may be settled, and fluid substantially free from solids may be removed from the basin 12 after aerobic conditions have been achieved in the system 10. Substantially free of solids means liquid with total suspended solids content that is less than 1% of that found in the digester. This settling and removing step may be performed after the aeration system 26 has been turned off (e.g., with no air flowing to the system 10). Treated sludge may be removed after aerobic conditions have been achieved in the system 10 for at least one hour and may be removed with the aeration system 26 still activated (e.g., while air is still flowing to the system 10). The anaerobic process may be run for at least eight hours, such as at least eight consecutive hours. The aerobic process may be run for at least one hours, such as at least one consecutive hour. The duration of aerobic process may be controlled and/or terminated based on a potassium or phosphorous level determined by the measuring device 36, as previously described. The settling and removing of the liquid may occur after the aeration system has been activated for at least one hour, and then subsequently deactivated. The treated sludge removal may occur after the aeration system has been activated for at least one hour, and is still activated.

The system 10 and process 100 described above may allow for energy efficiency and biological nutrient removal in secondary biological treatment and aerobic digestion, using nitrogen-based (ammonia/nitrate) and/or potassium-based and/or phosphate-based aeration control. The system 10 and process 100 may allow for a minimum amount of air to be necessary to remove ammonia and/or potassium and/or phosphate. They also may ensure that conditions are kept as anaerobic as possible to allow for nitrate removal and fully anaerobic conditions/fermentation for phosphorus release and subsequent aeration and phosphorus uptake with aeration.

Further, the system 10 and process 100 may minimize dissolved total nitrogen in the digester and the secondary biological treatment process by ensuring optimal aeration, thus creating necessary anoxic conditions. As used herein, anoxic conditions means a DO concentration <1 mg/L and a Nitrate ($NO_3$—N) concentration >1 mg/L. The system 10 and process 100 may reduce or eliminate the need for chemicals to remove phosphorus in wastewater treatment plants by ensuring fully anaerobic conditions to allow for fermentation to produce volatile fatty acids necessary for biological phosphorus uptake during a subsequent aerated phase prior to dewatering. In doing so, the system 10 and process 100 may keep phosphorus insoluble in the secondary biological treatment process so it does not return to the main treatment process when digested biosolids are dewatered. They may also reduce energy consumption by minimizing the amount of aeration time and fully utilizing nitrate as a source of "free" oxygen.

The system 10 and process 100 may remove ammonia and nitrate via biological nitrification/denitrification which may not happen in typical secondary biological treatment or aerobic digesters because pH and alkalinity are too low or there is no anoxic condition for denitrification. The system and process may reclaim alkalinity and pH and allow the bacterial nitrifiers to remove ammonia and denitrifiers to subsequently remove nitrate in anoxic conditions. Soluble phosphorus may be removed primarily biologically by phosphorus accumulating organisms that take up phosphorus during aerated conditions and release phosphorus during unaerated/anaerobic conditions. Typical secondary biological treatment and aerobic digesters do not have biological phosphorus removal because these bacteria require alternating aerobic/anaerobic conditions.

Another mechanism for phosphorus removal according to this invention may be precipitation of minerals such as struvite, hydroxyapatite, and hydroxydicalcium phosphate. These precipitation reactions do not occur in typical aerobic digesters because pH and alkalinity are too low.

Some benefits of the system 10 and process 100 previously described may include: energy reduction, chemical reduction, reduced effluent nitrogen and phosphorus, reduced nitrogen (ammonia/nitrate) and phosphorus in recycles to the mainstream plant, less sludge production due to lower chemical usage, and the same or better VSS (volatile suspended solids) destruction as typical aerobic digester but with smaller footprint (e.g., more rapid VSS destruction).

EXAMPLES

Referring to FIGS. 3-12, graphs and tables of concentration in or properties of the fluid (e.g., wastewater) at different times using the previously described system and process of the present invention are shown.

Example 1

Figure 3:
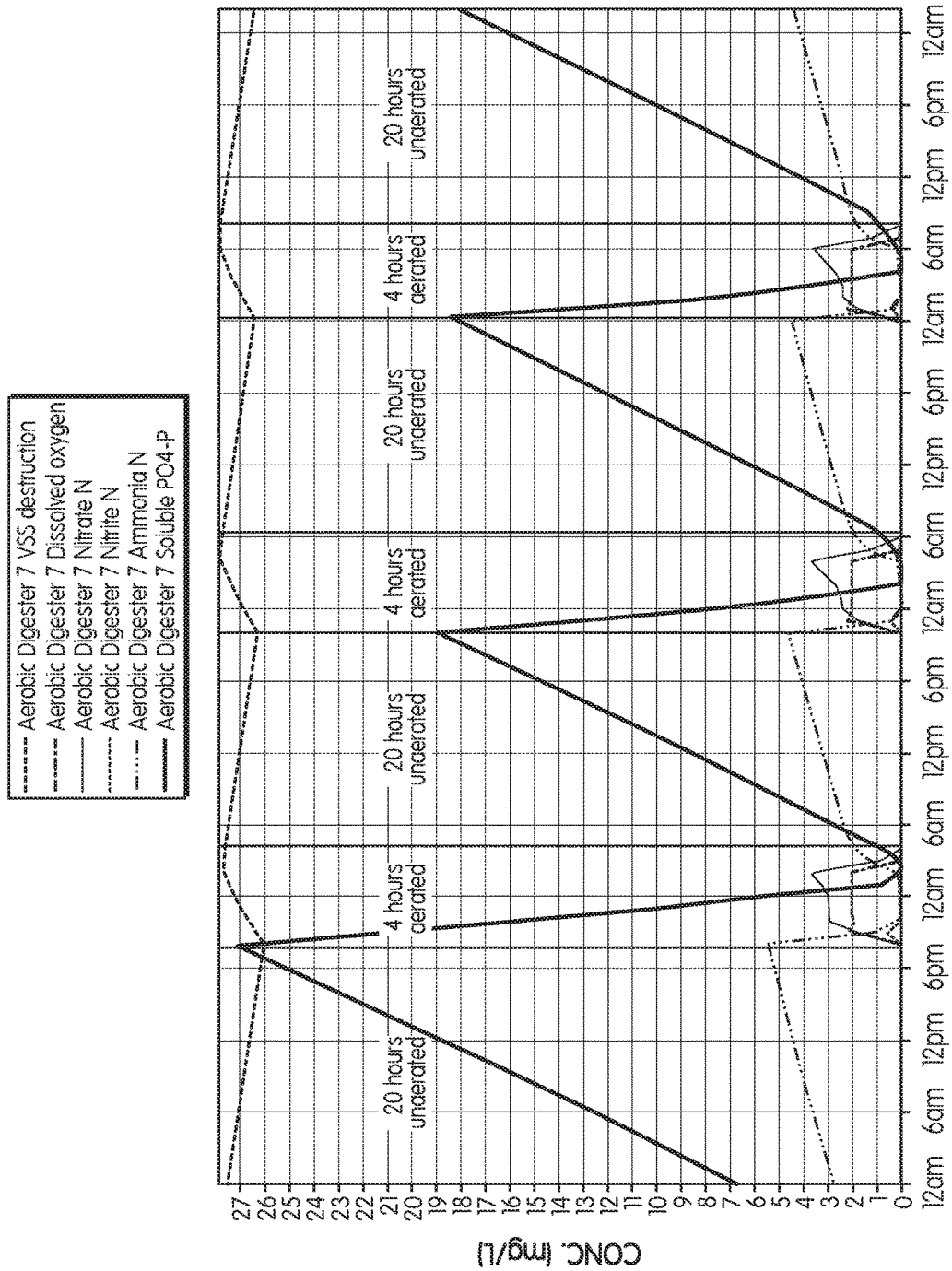
FIG. 3 shows a line graph of concentration over time of various components in a fluid treated using a process according to a non-limiting embodiment of the present invention.

Referring to FIG. 3, the concentration of various components over time during a modelled simulation using an embodiment of the process of the present invention carried out in a digester is shown. In FIG. 3, alternating steps of 20 hours of unaerated conditions followed by 4 hours of aerated conditions are used. FIG. 3 shows release of phosphorus under anaerobic conditions in the digester and subsequent uptake of phosphorus during aerated conditions. FIG. 3 also shows increase of ammonia during anaerobic conditions with a minimum nitrate and decrease of ammonia with increasing nitrate during aerated conditions.

Example 2

Figure 4:
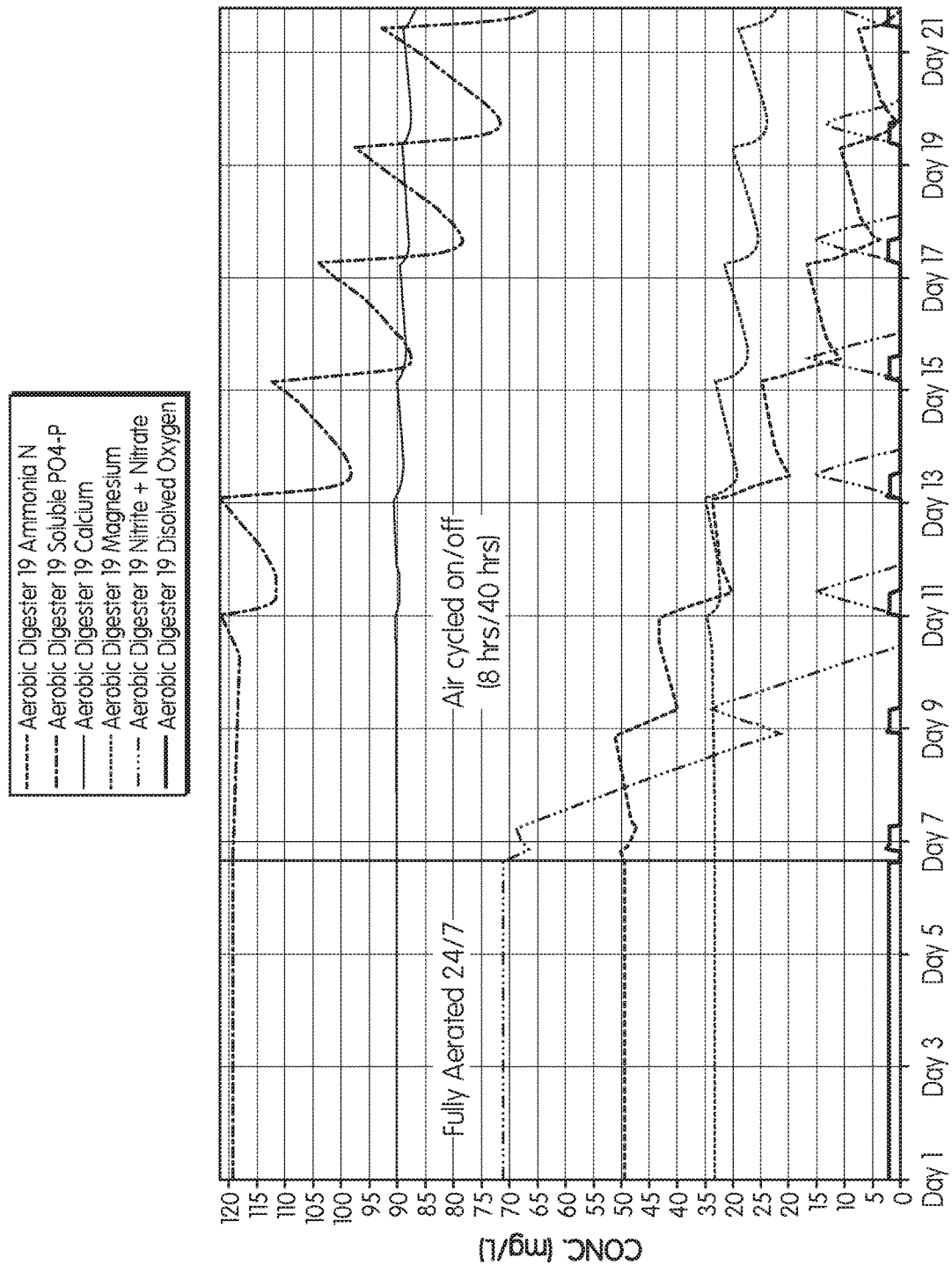
FIG. 4 shows a line graph of concentration over time of various components in a fluid treated using a process according to a non-limiting embodiment of the present invention.

Referring to FIG. 4, the concentration of various components over time during a modelled simulation using an embodiment of the process of the present invention carried out in a digester is shown. FIG. 4 shows the process operating initially under continuously aerated conditions (e.g., 24 hours each day), followed by alternating steps of 8 hours under aerated conditions followed by 40 hours under unaerated conditions. FIG. 4 demonstrates the benefit of operating an aerobic digester with cycling air on/off rather than fully aerated. FIG. 4 also shows soluble phosphate, ammonia and nitrate decreasing substantially when changing from fully aerated to cycling aeration on and off.

Example 3

Figure 5:
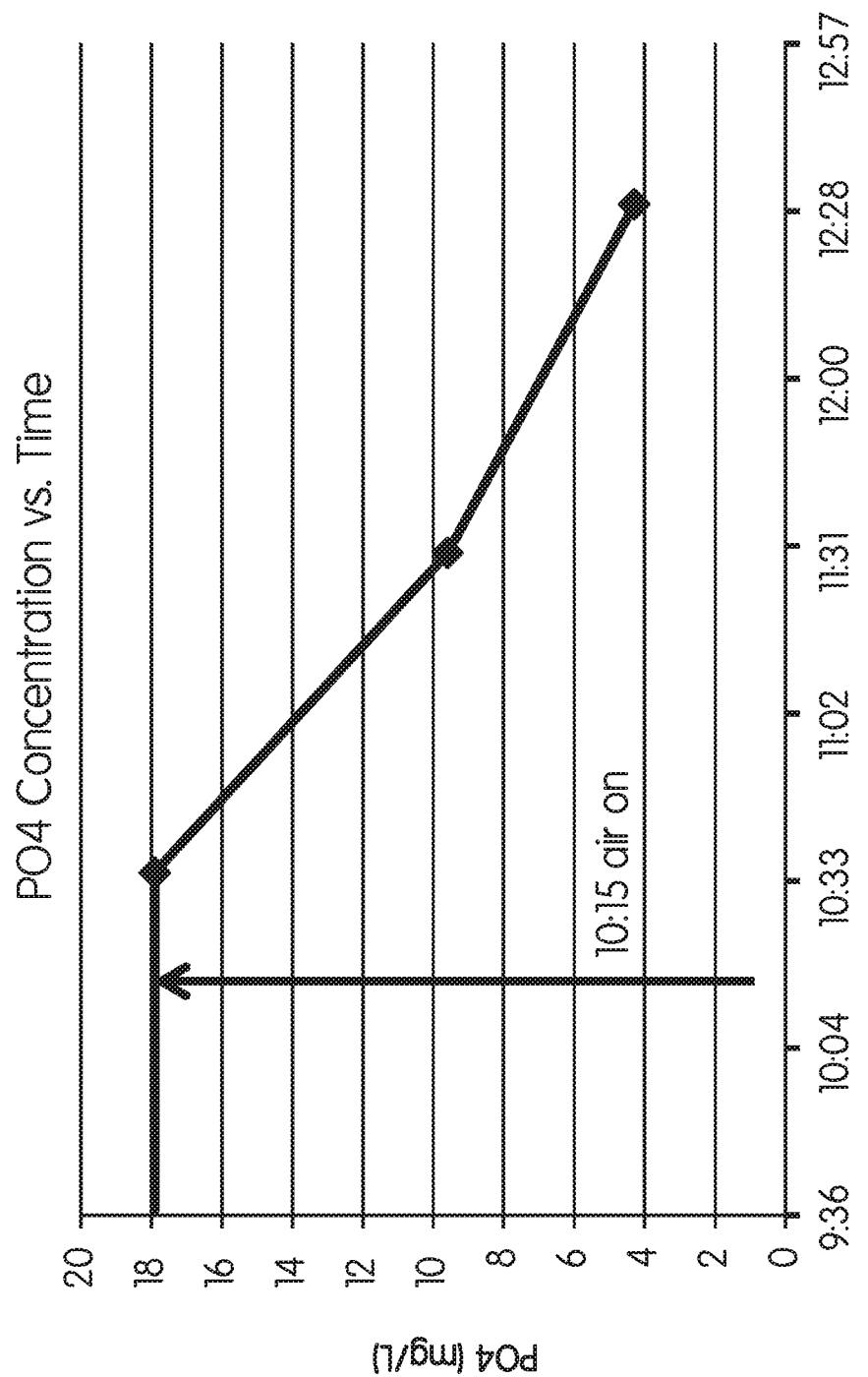
FIG. 5 shows a line graph of concentration over time of $PO_4$ using a process according to a non-limiting embodiment of the present invention.

Referring to FIG. 5, results of test using an embodiment of the process of the present invention carried out in a digester are shown. With the air turned on at 10:15 AM, the test showed that aeration results in rapid decline in soluble phosphorous over 2.5 hours.

Examples 4 & 5

Figure 6A:
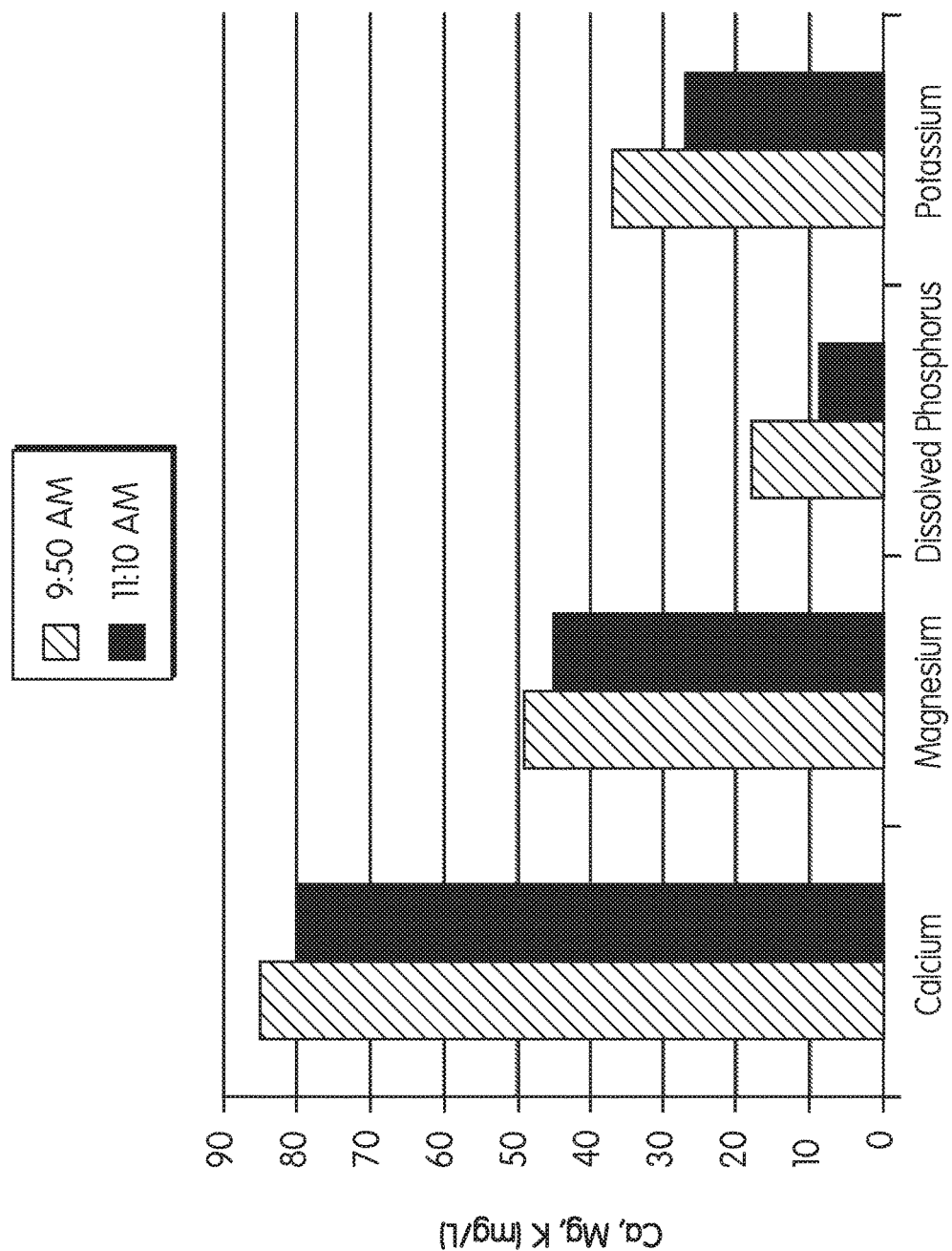
FIG. 6A shows a bar graph of concentration of various components in a fluid at two different times using a process according to a non-limiting embodiment of the present invention.
Figure 6B:
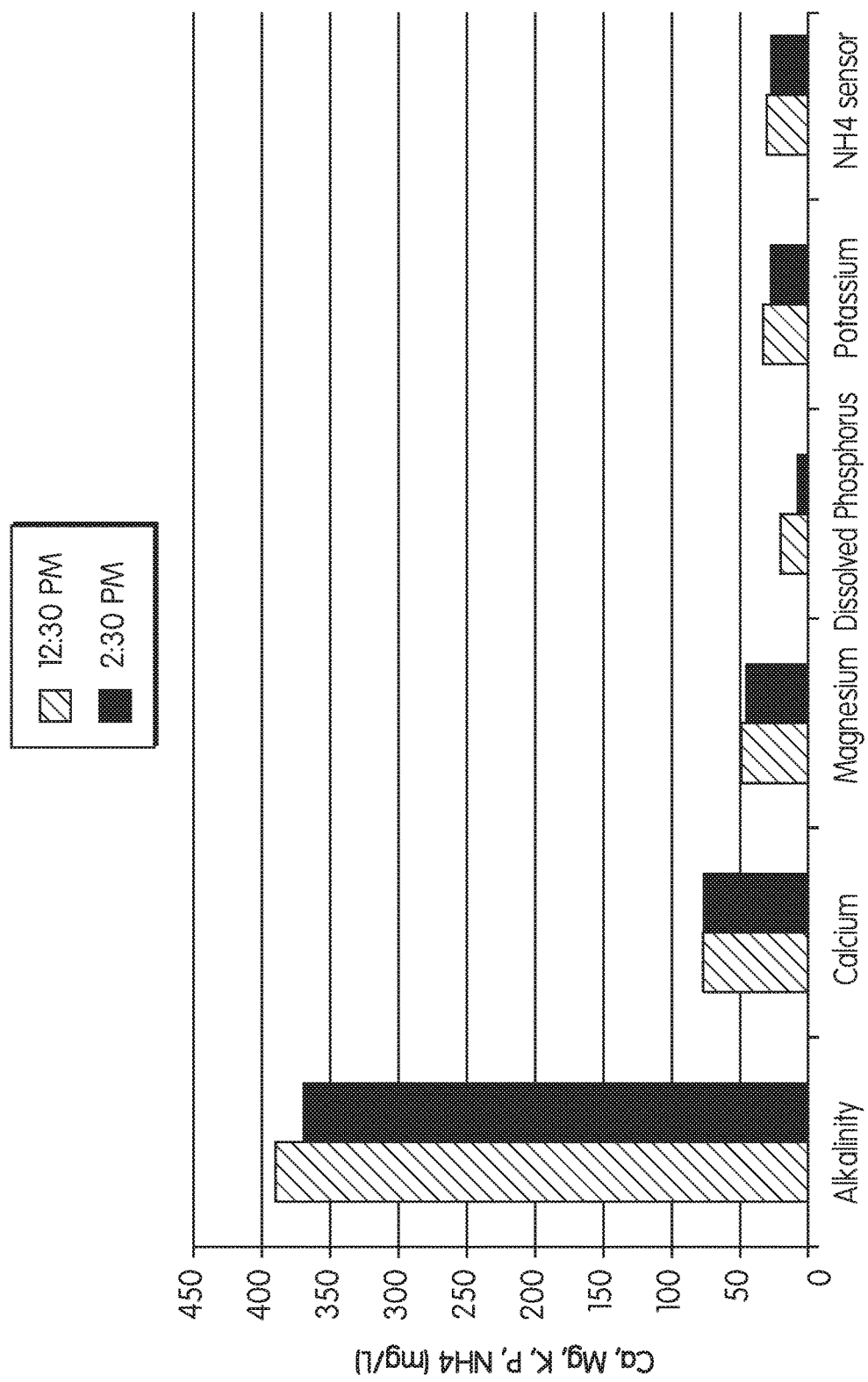
FIG. 6B shows a bar graph of concentration of various components in or properties of a fluid at two different times using a process according to a non-limiting embodiment of the present invention.

Referring to FIGS. 6A and 6B results of two tests using an embodiment of the process of the present invention carried out in a digester are shown. In the first test (FIG. 6A, Example 4), calcium, magnesium, dissolved phosphorous, and potassium concentrations were measured at two separate times (approximately 80 minutes apart). The results show that phosphorous concentration declines in conjunction with potassium and magnesium concentrations, indicating BioP (biological phosphorous removal) activity. In the second test (FIG. 6B, Example 5), alkalinity, calcium concentration, magnesium concentration, dissolved phosphorous concentration, potassium concentration, and ammonium ($NH_4$) concentration were measured at two separate times (approximately 2 hours apart). These results also show that phosphorous concentration declines in conjunction with potassium and magnesium concentrations, indicating BioP activity.

Example 6

Figure 7:
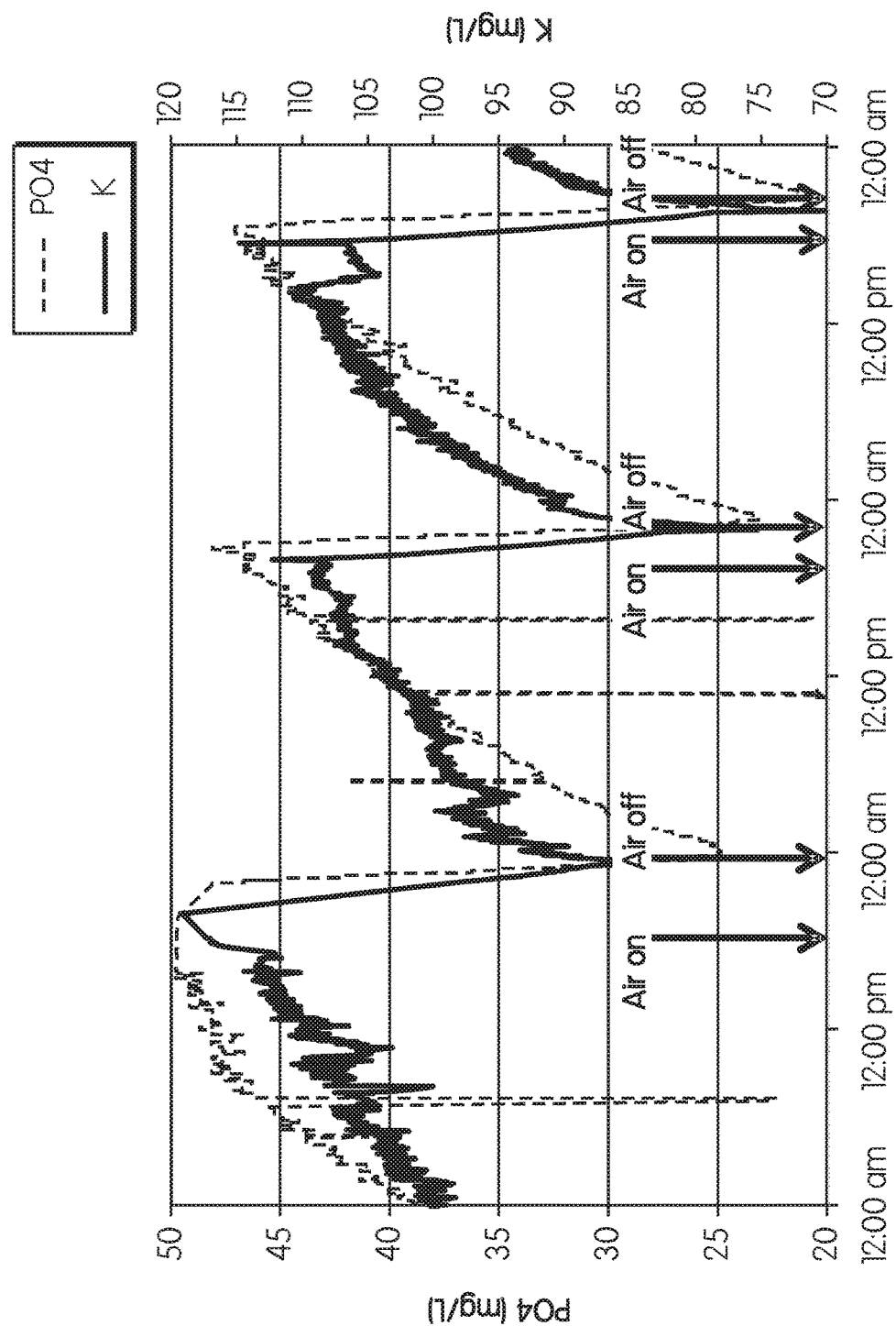
FIG. 7 shows a line graph of concentration over time of potassium and $PO_4$ using a process according to a non-limiting embodiment of the present invention.

Referring to FIG. 7, results of a test using an embodiment of the process of the present invention carried out in a digester are shown. This data shows rapid decline in potassium and phosphorus when the air in the process comes on. This decline in potassium tracks closely with a decline in phosphorus, indicating BioP uptake. The decline in potassium can decline in approximately a 1:1 relationship with the decline of the phosphorous.

Example 7

Figure 8:
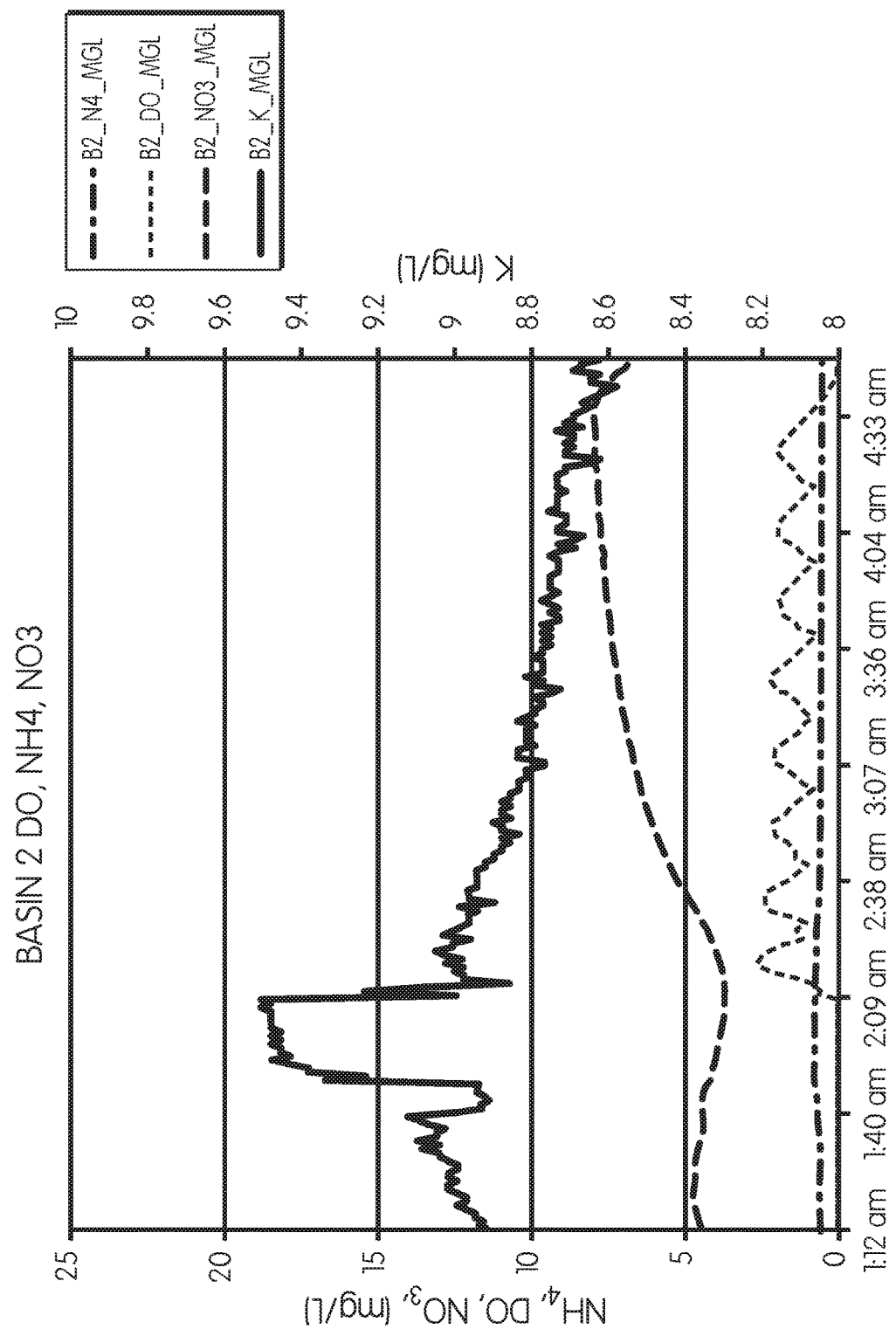
FIG. 8 shows a line graph of concentration over time of various components in a fluid treated using a process according to a non-limiting embodiment of the present invention.

Referring to FIG. 8, results of a test using an embodiment of the process of the present invention carried out in a sequencing batch reactor (SBR) are shown. The results show that a reduction in potassium also occurs in SBRs due to aeration, indicating BioP uptake.

Example 8

Referring to FIG. 9, results of two tests showing the concentration of several components using an embodiment of the process of the present invention are shown. The first test shows the concentration of the several components with the process carried out in a digester. The second test shows the concentration of the several components with the process carried out in an SBR. The data indicates that the concentrations of BioP bacteria (*Dechloromonas*) are at similar concentrations in the digester as in the SBR, showing that the release and uptake of phosphorus in both processes is due to microbial activity rather than chemical activity.

Example 9

Figure 10:
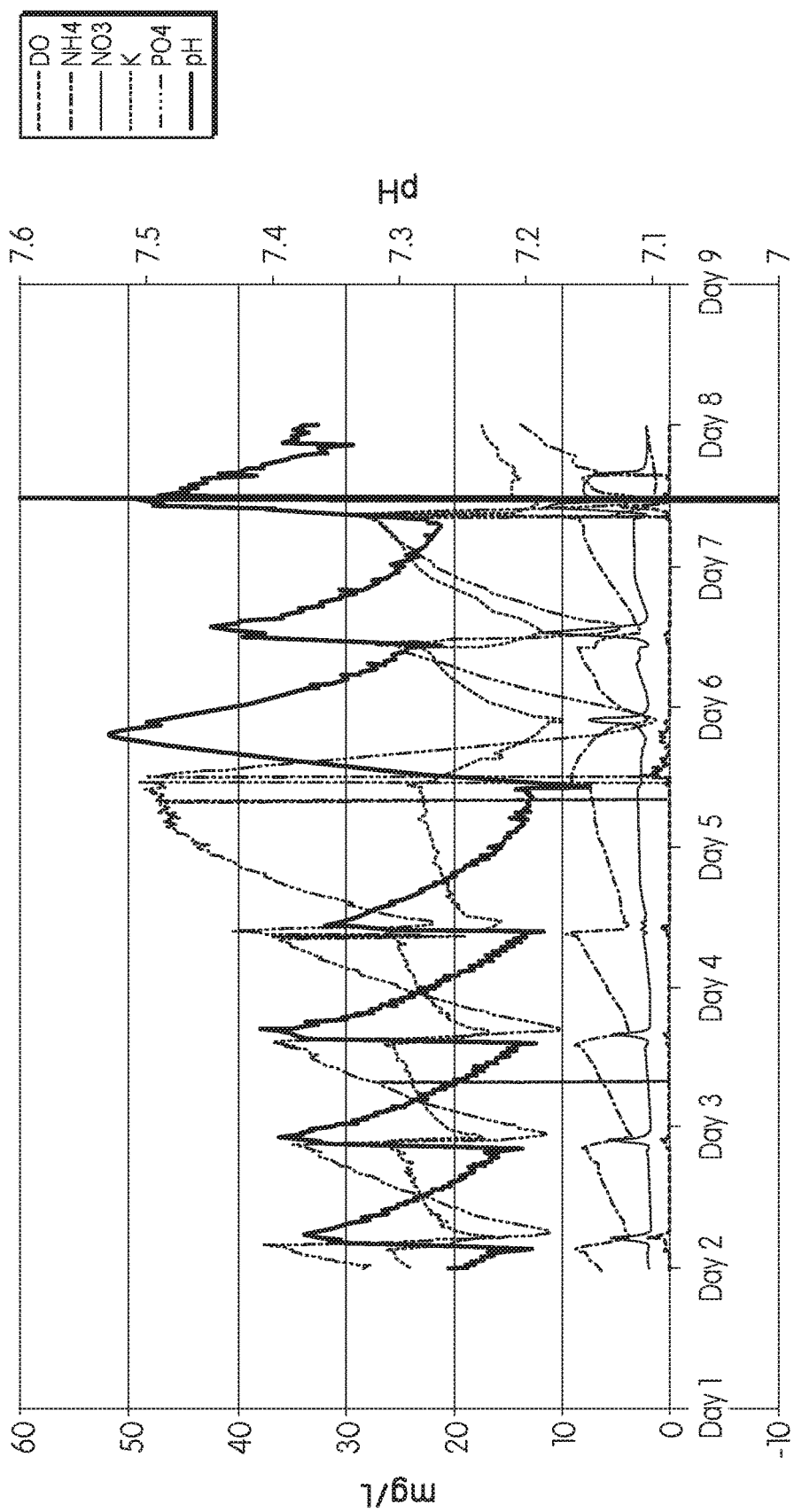
FIG. 10 shows a line graph of concentration over time of various components and pH in a fluid treated using a process according to a non-limiting embodiment of the present invention.

FIG. 10 shows the results of testing an aerobic digester and shows how maximum pH can be a strong indicator of good biological phosphorous removal performance FIG. 10 also shows how minimum pH can be an indicator of the amount of fermentation and production of volatile fatty acids, which are a prerequisite to good biological phosphorous removal. pH decreases during anaerobic conditions due to fermentation and production of volatile fatty acids necessary for biological phosphorous uptake. In the graph, maximum pH corresponds with minimum $PO_4$.

Example 10

Figure 11:
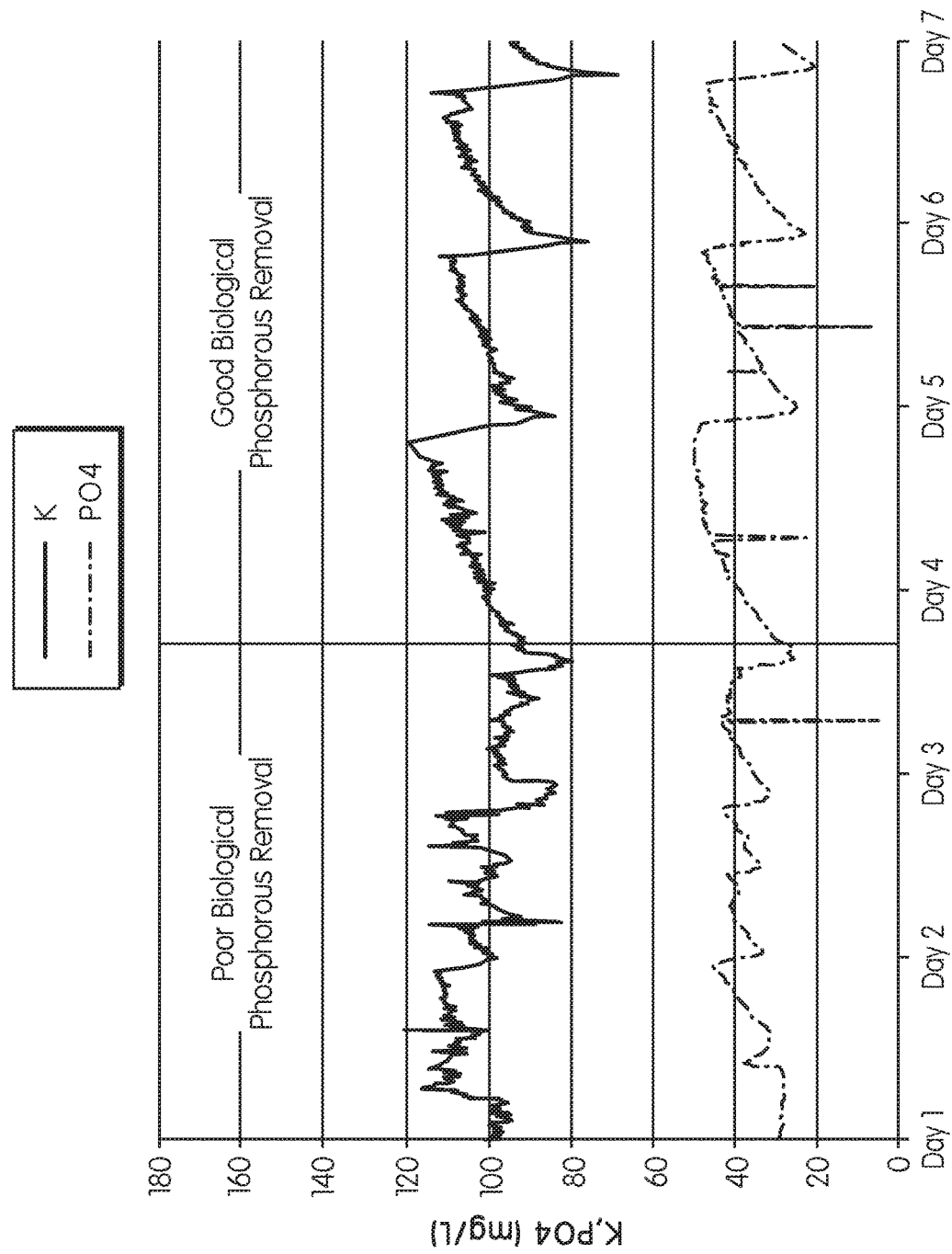
FIG. 11 shows a line graph of concentration over time of various components in a fluid treated using a process according to a non-limiting embodiment of the present invention.

FIG. 11 shows the results of testing an aerobic digester and shows a strong correlation between potassium and phosphorous when biological phosphorus removal is occurring. Potassium can be used as a surrogate to estimate phosphorus levels and to indicate biological phosphorous removal activity. In other words, potassium levels can be measured to estimate phosphorous levels because of this strong correlation. It is often difficult and expensive to measure the level of phosphorous. Potassium can often be easily and readily measured, making this strong correlation advantageous for estimating levels of phosphorous. The graph in FIG. 11 shows poor biological phosphorous removal (poor correlation between potassium and phosphorous) and a good biological phosphorous removal (good correlation between potassium and phosphorous).

Example 11

Figure 12:
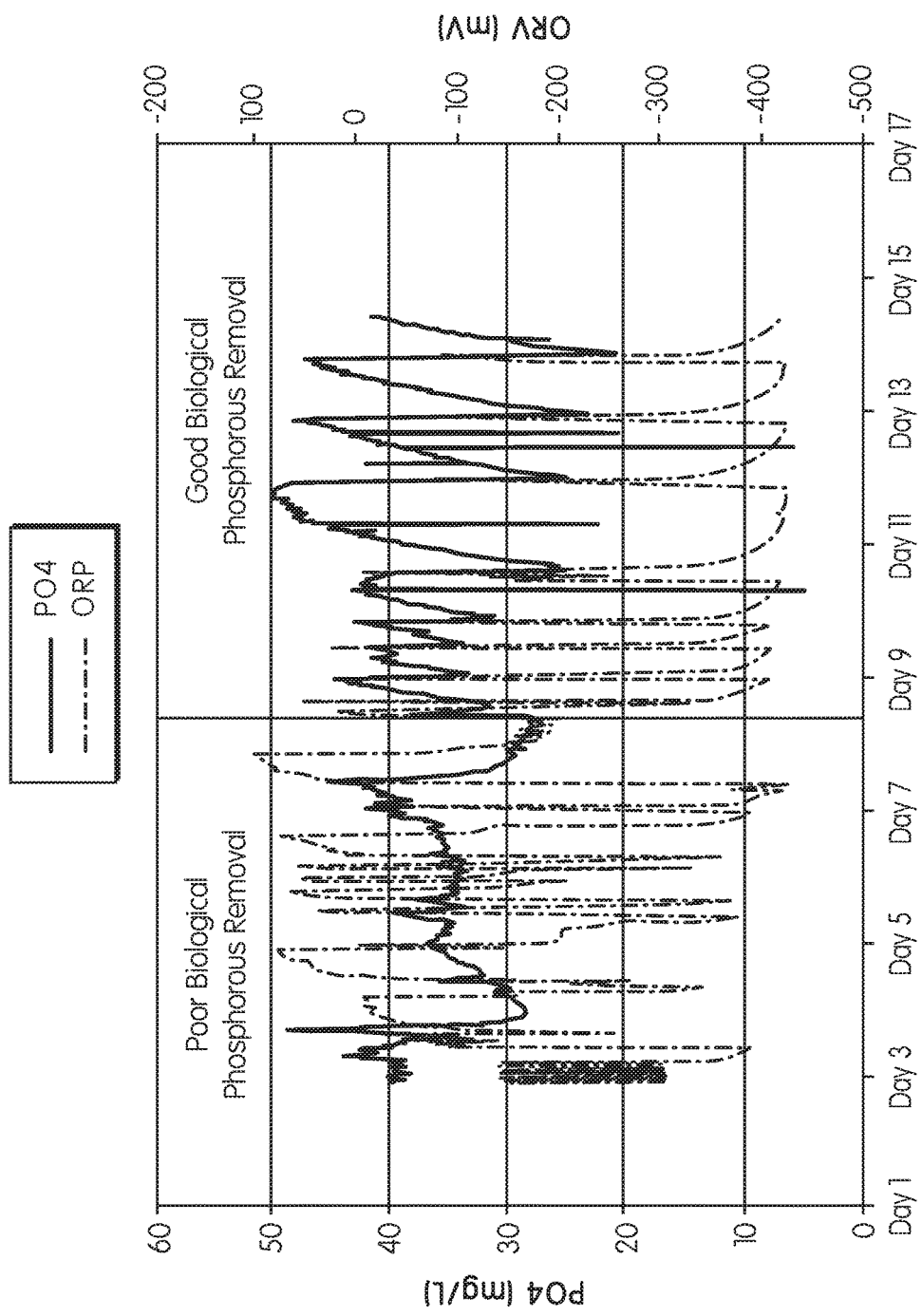
FIG. 12 shows a line graph of concentration of $PO_4$ and oxidation-reduction potential over time in a fluid treated using a process according to a non-limiting embodiment of the present invention.

FIG. 12 shows the results of testing an aerobic digester and shows how oxidation/reduction potential (ORP) can be used to determine whether conditions are sufficiently anaerobic to allow for fermentation, which is a prerequisite to good biological phosphorous uptake. FIG. 12 shows poor biological phosphorous removal (no cyclic phosphorous release and uptake) that is insufficiently anaerobic with poor fermentation. This situation has a high minimum ORP (>−350 mV, generally). FIG. 12 also shows good biological phosphorous removal (cyclic phosphorous release and uptake), that is sufficiently anaerobic with good fermentation. This situation has a low minimum ORP (<−400 mV generally).

Example 12

In this example, air is turned on at a set time of day rather than a maximum anaerobic time. For instance, aeration may be initiated based on a time of day setpoint that starts aeration at 9:00 AM. The controller monitors potassium and/or ammonia concentration. The air is turned off when the potassium and/or ammonia concentration reaches a minimum setpoint or the absolute value of the rate of change of potassium and/or ammonia falls below a setpoint. Waste sludge from the primary and/or secondary processes can be fed continuously or intermittently to the digester. Solids can be removed continuously or intermittently from the digester. Clear liquid can be removed from the digester by allowing time for settling and decanting or other methods of liquid removal such as recuperative thickening using membranes, dissolved air flotation, or centrifugation. Removal of clear liquid may coincide with aeration, or just following aeration, to achieve the lowest nutrient levels possible as this liquid is recycled to the main treatment process. The digester operation is intended to optimize biological nutrient removal (nitrogen and phosphorus).

While various embodiments were provided in the foregoing description, those skilled in the art may make modifications and alterations to these embodiments without departing from the scope and spirit of the invention. For example, it is to be understood that this disclosure contemplates that, to the extent possible, one or more features of any embodiment can be combined with one or more features of any other embodiment. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. A process for biological nutrient removal comprising:
receiving fluid comprising sludge in a basin through a sludge inlet;
activating an aeration system based at least partially on a time of day;
periodically measuring a potassium level of the fluid;
determining a potassium rate of change based on the periodic measurements of potassium level; and
deactivating the aeration system based at least partially on the determined potassium rate of change.

2. The process of claim 1, further comprising determining a phosphorus level of the fluid based partially on the periodic measurements of potassium level.

3. The process of claim 1, further comprising an aerobic process during which the aeration system is activated and an anaerobic process during which the aeration system is deactivated, wherein the process alternates between the aerobic process and the anaerobic process.

4. The process of claim 3, wherein, during the course of a day, the anaerobic process runs for a longer time than the aerobic process.

5. The process of claim 1, wherein the aeration system is deactivated after the determined potassium rate of change is greater than or equal to zero.

6. The process of claim 1, further comprising determining a rolling average of the potassium rate of change for a predetermined period and deactivating the aeration system after the rolling average is greater than or equal to zero.

7. The process of claim 1, further comprising activating a blower configured to deliver airflow to the fluid in the basin after activation of the aeration system, and at a predetermined period of time before determining the potassium rate of change.

8. The process of claim 1, further comprising mixing the fluid after activating the aeration system.

9. The process of claim 1, further comprising removing liquid substantially free of solids from the basin.

10. The process of claim 1, further comprising removing the sludge from the basin and dewatering treated sludge.

11. A system for biological nutrient removal comprising:
a basin comprising an inlet for receiving a fluid comprising sludge;
an aeration system configured to provide air to the fluid;
a measuring device disposed in the fluid and configured to periodically measure a potassium level of the fluid; and
a controller in communication with the measuring device and the aeration system, the controller configured to determine a potassium rate of change and to activate and deactivate the aeration system.

12. The system of claim 11, wherein the controller is configured to determine a phosphorus level of the fluid based partially on the periodic measurements of potassium level from the measuring device.

13. The system of claim 11, wherein the system is configured to run an aerobic process during which the aeration system is activated and an anaerobic process during which the aeration system is deactivated, wherein the system is configured to alternate between the aerobic process and the anaerobic process.

14. The system of claim 13, wherein, during a course of a day, the system is configured to run the anaerobic process for a longer time than the aerobic process.

15. The system of claim 11, wherein the controller is configured to deactivate the aeration system after the potassium rate of change is determined to be greater than or equal to zero.

16. The system of claim 11, wherein the controller is configured to determine a rolling average of the potassium rate of change for a predetermined period and to deactivate the aeration system after the rolling average is determined to be greater than or equal to zero.

17. The system of claim 11, further comprising a blower configured to deliver airflow to the fluid in the basin after activation of the aeration system, and at a predetermined period of time before the controller determines the potassium rate of change.

18. The system of claim 11, further comprising a mixer disposed in the basin and configured to mix the fluid after the controller activates the aeration system.

19. The system of claim 11, further comprising a decanter configured to remove liquid substantially free of solids from the basin.

20. The system of claim 11, further comprising a sludge pump configured to remove treated sludge from the basin, and a dewatering system configured to dewater the sludge.

21. A process for biological nutrient removal comprising:
receiving fluid comprising sludge in a basin through a sludge inlet;

alternating between an anaerobic process in which an aeration system is deactivated in order to achieve fermenting conditions and an aerobic process in which the aeration system is activated in order to achieve aerobic conditions;

settling the fluid comprising sludge and removing liquid substantially free from solids from the basin after aerobic conditions have been achieved; and removing treated sludge after aerobic conditions have been achieved for at least one hour, wherein removal of the sludge occurs with the aeration system activated, wherein a duration of the aerobic process is controlled and/or terminated based on a determined potassium level and/or phosphorous level.

22. The process of claim 21, wherein the anaerobic process is run for at least 8 hours.

23. The process of claim 21, wherein the aerobic process is run for at least 1 hour.

24. The process of claim 21, wherein the settling and liquid removal step occurs after the aeration system has been activated for at least one hour.

25. The process of claim 21, wherein the treated sludge removal step occurs after the aeration system has been activated for at least one hour.

* * * * *